United States Patent
Take et al.

(10) Patent No.: US 8,367,183 B2
(45) Date of Patent: Feb. 5, 2013

(54) SANDWICH PANEL INCLUDING HONEYCOMB STRUCTURE BODY AND METHOD OF PRODUCING THE SANDWICH PANEL

(75) Inventors: Kouichi Take, Yokohama (JP); Kunio Takahashi, Hadano (JP)

(73) Assignee: Kabushiki Kaisha Shizuka, Yokosuka-shi (JP)

( * ) Notice: Subject to any disclaimer, the term of this patent is extended or adjusted under 35 U.S.C. 154(b) by 0 days.

(21) Appl. No.: 13/137,054

(22) Filed: Jul. 18, 2011

(65) Prior Publication Data

US 2012/0021169 A1 Jan. 26, 2012

Related U.S. Application Data

(63) Continuation-in-part of application No. 11/792,311, filed as application No. PCT/JP2006/311230 on Jun. 5, 2006, now abandoned.

(30) Foreign Application Priority Data

Jun. 8, 2005 (JP) .................................. 2005-167921
Aug. 31, 2005 (JP) .................................. 2005-251877

(51) Int. Cl.
- *B32B 3/12* (2006.01)
- *B32B 3/26* (2006.01)
- *B01D 46/00* (2006.01)
- *B29C 65/00* (2006.01)

(52) U.S. Cl. .................... 428/117; 428/913; 428/304.4; 55/529; 156/89.11; 52/302.11

(58) Field of Classification Search .................... None
See application file for complete search history.

(56) References Cited

U.S. PATENT DOCUMENTS

| 2,744,042 | A |   | 5/1956 | Pace ............................. 264/46.5 |
| 3,249,659 | A | * | 5/1966 | Voelker ....................... 264/46.2 |
| 3,692,706 | A | * | 9/1972 | Igglesden .................... 521/106 |
| 3,856,615 | A |   | 12/1974 | Dreher ......................... 428/12 |
| 4,063,982 | A | * | 12/1977 | Bourke ........................ 156/254 |
| 4,207,366 | A | * | 6/1980 | Tyler ........................... 428/73 |
| 4,687,691 | A |   | 8/1987 | Kay ............................ 428/73 |
| 7,017,981 | B2 | * | 3/2006 | Strohmavr et al. ............ 296/210 |
| 2004/0028877 | A1 |   | 2/2004 | Itoh et al. ..................... 428/118 |
| 2004/0253407 | A1 |   | 12/2004 | Shah et al. ..................... 428/73 |
| 2006/0008616 | A1 | * | 1/2006 | Dean et al. .................... 428/117 |

FOREIGN PATENT DOCUMENTS

| JP | 48-054050 | * | 11/1971 |
| JP | 48-64050 |   | 11/1971 |
| JP | 48-64050 |   | 8/1973 |
| JP | 7-088995 |   | 4/1995 |
| JP | 8-230081 |   | 9/1996 |
| JP | 2003-236953 |   | 8/2003 |
| JP | 2004-82677 |   | 3/2004 |

\* cited by examiner

*Primary Examiner* — David Sample
*Assistant Examiner* — Nicole T Gugliotta
(74) *Attorney, Agent, or Firm* — Kratz, Quintos & Hanson, LLP

(57) ABSTRACT

The breadth and width of a sheet-like filler material before it is placed in a cell of a honeycomb material is set greater than those of the honeycomb material, and after the placement, peripheral edges of the honeycomb material are fringed with filler materials to prevent a filler material from falling out of an end section cell. A liquid adhesive agent is applied to the top of cell walls facing one surface of the honeycomb material, and a surface material is pressed to that surface of the honeycomb material to which the adhesive agent is applied. Then, before the adhesive agent hardens, water-absorbing foam materials are placed in cell spaces by pressing them into the cell spaces from the other surface of the honeycomb material until they are in contact with the adhesive agent. The foam material is quickly adhered to the honeycomb material.

5 Claims, 4 Drawing Sheets

(A)     (B)

(A)     (B)

(A)     (B)

(A)     (B)

(A)    (B)

Figure 1:
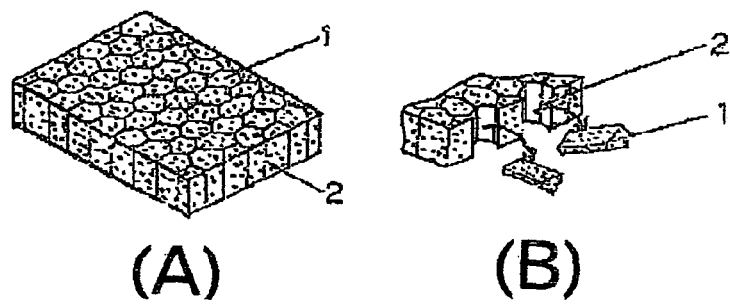

SANDWICH PANEL INCLUDING HONEYCOMB STRUCTURE BODY AND METHOD OF PRODUCING THE SANDWICH PANEL

CROSS-REFERENCE TO RELATED APPLICATIONS

This application is a Continuation-In-Part Application of Ser. No. 11/792,311 filed on Feb. 8, 2008, now abandoned which is based on PCT International Application No. PCT/JP2006/311230 filed on Jun. 5, 2006, the entire contents of both of which are incorporated herein by reference. This application is based on and claims priority of Japanese Patent Application No. 2005-167921 filed on Jun. 8, 2005, and Japanese Patent Application No. 2005-251877 filed on Aug. 31, 2005, the entire contents of which are incorporated herein by reference.

FIELD OF INVENTION

The present invention relates to a gas-permeable sandwich panel provided with outer surface porous stuff, and a honeycomb structure body at the center thereof, in which cells of a honeycomb are filled with phenol foam of a linked-cellular structure.

BACKGROUND OF INVENTION

Sandwich panels with a honeycomb structure body at the center thereof are used for walls and floors in airplanes, railway-vehicles and houses. Among the uses of sandwich panels, sound barrier material and sound absorbing material are important.

In this specification, a sandwich panel for sound barrier material is supposed as such provided with gas barrier layers on both sides and a piece of honeycomb at the center thereof, regardless of cells of the honeycomb being filled up or vacant. A sound absorbing material is supposed as such provided with gas permeable stuff at least on one side thereof, having cells of the honeycomb being filled up with porous material for attenuating sounds which make incidence through the gas permeable stuff. However, it is not certain, from person to person, whether a sandwich panel is called as a sound barrier material or a sound absorbing material.

Prior-art documents which may have some relationship with the present invention are raised below and explained briefly. The patent document 1 (JP-07-88995) presents an example in which cells of a honeycomb are filled up with some filler material. It discloses a structure body in which a honeycomb 2 and a sheet-like filler material 1 have the same breadths and widths. FIG. 1A of the present invention shows the same honeycomb - filler configuration shown in the patent document 1, and FIG. 1B of the present invention explains how the filler material drops off from the outer edge area of the honeycomb in the configuration shown in FIG. 1A.

The reason is that the six-sided cell walls located in the outer edge area of the honeycomb become opened when the cell walls are cut out, and the filler material can not be stably held there. When one wishes to produce a sandwich panel using the honeycomb structure body mentioned above, cutting the honeycomb structure body to fit the surface material is necessary. However, if the honeycomb and the filler material have the same dimensions, it can not be avoided the filler material from dropping off out of the outer edge area of the honeycomb due to above-mentioned reason.

Empty cells produced by the filler material that drops off deteriorate the barrier capabilities against sound and heat expected to the filler material, and damage the commodity value of the sandwich panel. Further, the filler material that have dropped off from the cells have to go to waste.

To prevent the filler material from dropping off, it may be possible to fix the filler material to the honeycomb with an adhesive agent. However, the adhesive agent will cause increase in cost and weight, besides work load, and in addition, it will cause to deteriorate the barrier capabilities against sound and heat of the sandwich panel.

The patent document 2 (JP-09-156010) discloses another invention, titled "Method of producing sound absorbing panel." The described sound absorbing panel consists of a piece of honeycomb with empty cells, having a mesh layer over a perforated metal plate on each side of the honeycomb with a very thin film-like adhesive agent of thermosetting resin. However, the described empty cells differs from the definition of a sound absorbing panel.

The patent document 3 (JP-01-198951) discloses an invention titled "Method of producing panel-like core stuff." There are described that a foam material is inserted into cells of a honeycomb with pressure, that an adhesive agent is applied to inner surface of the cells by dipping or spraying, and so on. However, no special precaution in application of the adhesive agent not to damage the gas permeability of the surface material is seen. In a drawing (FIG. 6) of the document showing an example, the adhesive agent is drawn as a plane (a horizontal line, in a section).

The patent document 4 (JP-Utility Model-61-30844) discloses a utility model titled "Sandwich panel," in which a foam sheet having a thickness smaller than the height of a honeycomb is inserted into the cells of the honeycomb to the half depth of the cells. There are described that adhesion between the honeycomb and the surface materials is made at the end of the honeycomb, that the foam material can be melt by the adhesive agent, if the end surface of the foam material (polyurethane foam) comes to the level of the end surface of the honeycomb, and that unevenness of the surface material can be made in that case. However, no special precaution in application of the adhesive agent not to damage the gas permeability of the surface material is seen.

SUMMARY OF THE INVENTION

Problems to be solved by the present invention, in producing a gas permeable sandwich panel provided with outer surface porous stuff, and a honeycomb structure body at the center thereof, in which cells of a honeycomb are filled with phenol foam of a linked-cellular structure, are an effective measure to prevent dropping off of the filler material from the cells located in the outer edge area of the honeycomb (the first problem), and a method of applying the adhesive agent not to damage the permeability of the foam material and surface porous stuff (the second problem).

The first problem can be solved by selecting the breadth and width of the sheet-like foam material larger than those of the honeycomb, so that the honeycomb is surrounded by the edges of the sheet-like foam when it is pressed into the cells of the honeycomb.

The honeycomb can be made of paper, metal, plastics, ceramics and others, and the filler material can be chosen from hard foams of phenol, polyurethane, polystyrene, and other plastics. A hard foam of phenol with a linked-cellular structure, which exibits a superor absorbing abilities to water and sounds, is particularly suited. Laying the sheet-like filler material and the honeycomb together, and pressing them by a press machine, a honeycomb structure body in which the filler material is filled in the cells of the honeycomb is produced.

The second problem can be solved by a method of producing a sandwich panel including the steps of applying a liquid adhesive agent of a specified viscosity to a narrow band at the tips of the cell walls directing one side of the honeycomb, pushing the porous surface material against the tips of the cell walls, pressing the water-absorbing foam material into the cells of the honeycomb, from the other side of the cell where the adhesive agent has been applied, until it comes to contact with the adhesive agent, so that the foam material absorbs water from the adhesive agent to accelerate hardening.

Applying the adhesive agent all over the surface of the foam material or surface material should be avoided. An alternative way is to limit the amount and spot of applying the adhesive agent, not to damage their permeability. Adhesion between the honeycomb and the surface material should be made in the limited spots where the tips of the cell walls make contact with the surface material.

It is necessary to remove water from the adhesive agent to make it harden. However, evaporation of water in the sandwich panel is slow because it is a closed space, and hardening of the adhesive agent is time consuming. So, the supreme water-absorbing ability of the phenol foam is utilized in the present invention, by applying the adhesive agent only to the tips of the cell walls of the honeycomb, pressing the surface material against there, inserting the water-absorbing foam into the cells of the honeycomb by pressing it in the other side thereof where the adhesive agent has not been applied, until it comes in contact with the adhesive agent. Then, water contained in the adhesive agent is rapidly absorbed, and hardening is accelerated. The water absorbed by the foam is evaporated gradually through the permeability of the sandwich panel.

According to the invention, because the sheet-like foam is given a greater plane size than that of the honeycomb, the foam is not cut apart to pieces by surrounding the edges of the honeycomb and the oneness of the foam is preserved even after it is inserted into the cells of the honeycomb.

The honeycomb structure body disclosed herein gives a sandwich panel of good appearance by an easy processing, because the foam material is barely exposed around the honeycomb.

Various after-processing such as attaching a space filler connecting partly the surface material, putting a reinforcement for attachment of other elements, or inserting wooden plates or plastic plates around the panel to connect to the surface material, can be easily done by the softness and easy-process ability of the foam material barely exposed around the honeycomb.

According to another aspect of the invention, damages to the permeability is kept to the least, as the quantity of the adhesive agent applied to the surface material is strictly limited. For example, in case of a honeycomb having six-sided cell walls, the spots where the adhesive agent is applied are the tips of the cell walls and a hexagonal contour of the walls on the surface material, the area of which in total is very small.

Further, a precise positioning of the surface material on the honeycomb is attained, as the adhesive agent hardens fast enough for preventing the surface material from diverging from its right position, by absorbing the water in the adhesive agent with the phenol foam.

BRIEF DESCRIPTION OF DRAWING FIGURES

FIG. 1 (A): honeycomb structure body shown in a prior art document, and (B): a view in which foam material falls off from cell spaces of the honeycomb.

Figure 2:
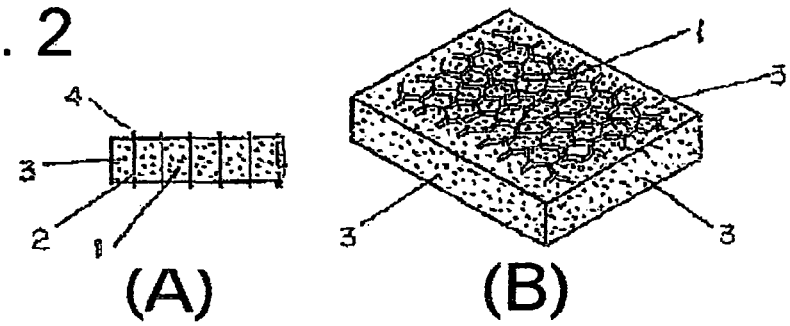

FIG. 2: section drawing (A) and plan drawing (B) showing the first example of the present invention, in which dimensions of the foam material are larger than those of the honeycomb.

Figure 3:
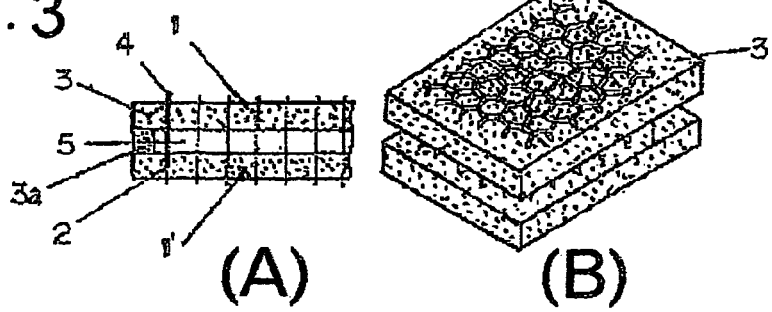

FIG. 3: section drawing (A) and plan drawing (B) showing the second example of the present invention, in which the air room is formed in the middle of the honeycomb.

Figure 4:
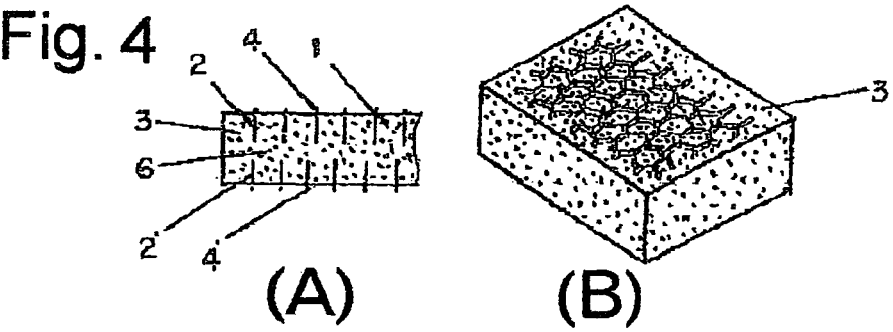

FIG. 4: section drawing (A) and plan drawing (B) showing the third example of the present invention, in which the intermediate foam layer is formed in the middle of the foam material.

Figure 5:
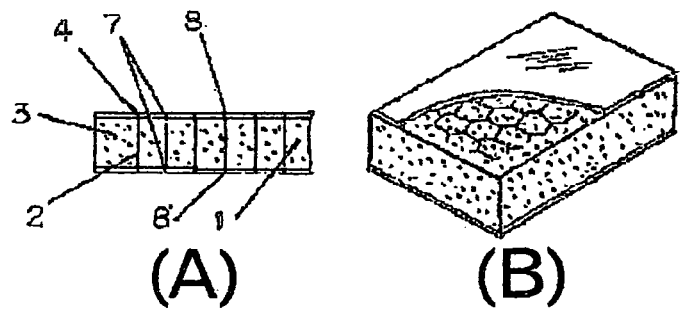

FIG. 5: section drawing (A) and plan drawing (B) showing the fourth example of the present invention, in which the surface materials are attached on both sides of the sandwich panel.

Figure 6:
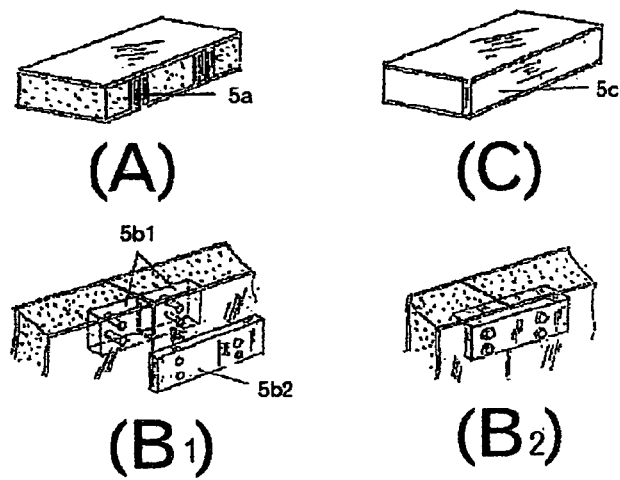

FIG. 6 (A): a reinforcement $5a$ inserted partly around the panel. ($B_1$ and $B_2$): a screw plate $5b1$ for fixing a connecting plate $5b2$ for connecting two panels with screw to a prescribed position on the surface of the panel. (C): a protection plate $5c$ put to the entire periphery of the panel.

Figure 7:
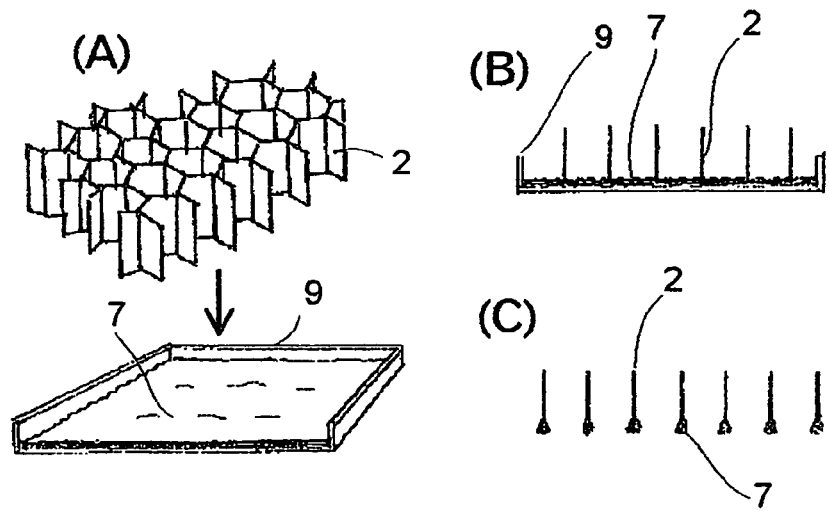

FIG. 7 (A): flat and open vat in which adhesive agent is poured, and honeycomb. (B): honeycomb immersed in adhesive agent held in the vat. (C): adhesive agent put to the tip of the cell wall.

Figure 8:
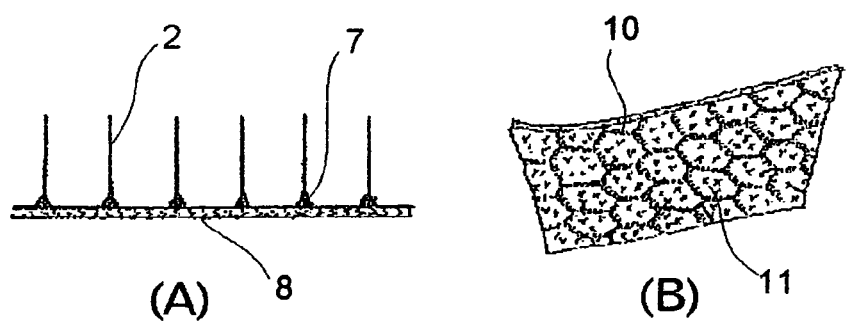

FIG. 8 (A): a gas permeable surface material is adhered to the honeycomb. (B): broken cell walls near the adhered spots on the surface material, after removed from the honeycomb for testing.

Figure 9:
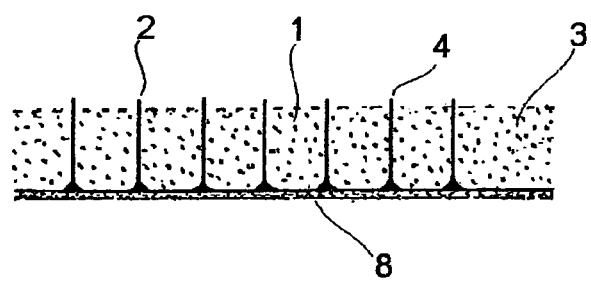

FIG. 9: foam material filled in the cell spaces.

Figure 10:
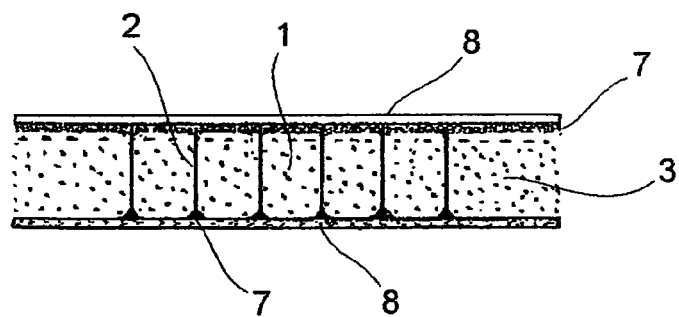

FIG. 10: completed sandwich panel by putting surface material to the honeycomb shown in FIG. 9.

Figure 11:
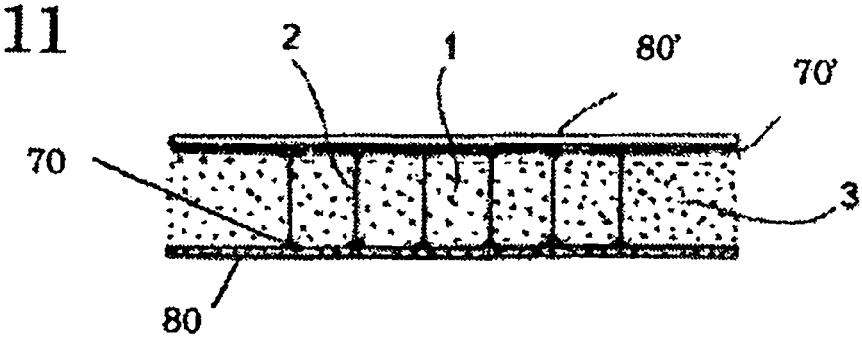

FIG. 11: another completed sandwich panel obtained by putting surface material to the honeycomb shown in FIG. 9.

Figure 12:
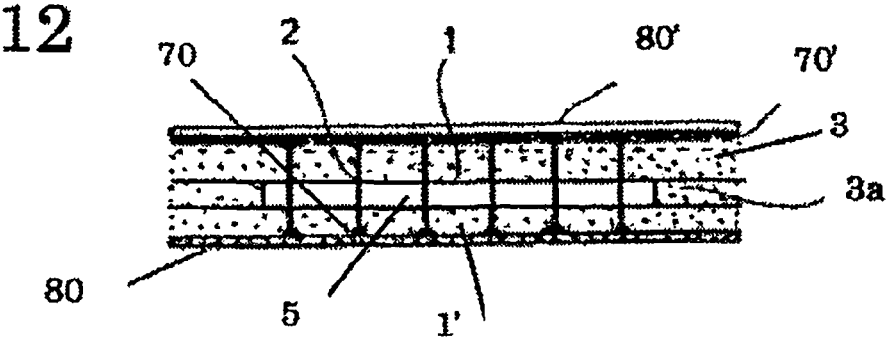

FIG. 12: completed sandwich panel obtained by putting surface material to the honeycomb shown in FIG. 3(A).

DETAILED DESCRIPTION OF PREFERRED EMBODIMENT (A list of reference signs is at the end of the Detailed Description.)
(First Embodiment)

The first preferred embodiment to the invention is as follows:

In the honeycomb structure body, an upward end and/or a downward end of the honeycomb (2) project(s) by a certain length beyond the surface(s) of the foam (1).

Using the honeycomb structure body having the projection(s) to produce a sandwich panel, it becomes possible to apply the adhesive agent only to the tip(s) of the projection(s) and to avoid putting the adhesive agent to the surface of the foam material.
(Second Embodiment)

The second preferred embodiment to the invention is as follows:

One more sheet of phenol foam (1') is included in the honeycomb structure body, and the two sheets (1, 1') together are inserted into the cells of the honeycomb (2) from upper and bottom ends of the cells to make a room (5) of a certain depth between the two sheets in the middle of the thickness of the honeycomb.

Because of the air room, the sound absorbing characteristic, in from low to high frequencies, of the embodied honeycomb structure body becomes improved, and a sound absorbing material for a full frequency band is realized.

(Third Embodiment)

The third preferred embodiment to the invention is as follows:

One more honeycomb (2') is included in the honeycomb structure body, in which the foam (1) has a thickness greater than the total thickness of the two honeycombs (2, 2'), and the two honeycombs are pressed into the foam from both sides thereof, leaving an intermediate foam layer (6) where no honeycomb is included.

Because of the intermediate foam layer, the heat flow conducting in the honeycomb structure body is cut, and the intermediate foam layer makes itself an adiabatic layer.

(Fourth Embodiment)

The fourth preferred embodiment to the invention is as follows:

In any one of the above-mentioned honeycomb structure body, one of surface materials (80, 80') adhered to both sides is gas permeable material and another one is gas barrier material.

(Fifth Embodiment)

A preferred embodiment which realizes a state in which the liquid adhesive agent is applied to the tips of cell walls in a narrow belt-like areas, further comprises the steps of:

selecting an emulsion adhesive agent for the adhesive agent, pouring the emulsion adhesive agent into a flat vat, dipping only the tips of the cell walls of the honeycomb there and pulling up.

As it is hard to apply a low viscosity adhesive agent, which flows easily, to the tips of cell walls, one which exhibits an appropriate viscosity (and a surface tension, at the same time) is preferred. From that reason, an emulsion adhesive agent is selected in the present embodiment. It is convenient to dip the tips of the cell walls in the vat where the adhesive agent is poured, to apply it only to the tips in a narrow belt-like areas.

EXAMPLE 1

FIGS. 2A and 2B are a section and a plan showing a honeycomb structure body for a first example of the present invention, which consists of a foam material 1 and a honeycomb 2. In this example, a hard foam material of phenol having a linked-cellular structure, and dimensions of 1030×1030×28 mm in breadth-width-thickness, with a density of less than 30 kg/m$^3$, was selected. And, as the honeycomb material, a paper honeycomb having a cell-size (length between parallel walls) of 12 mm and dimensions of 1000×1000×30 mm in breadth-width-thickness was selected.

As the selected phenol foam has a low density, and has a hardness suited to be cut by the cell walls of the honeycomb, the foam is filled in the cells of honeycomb in a good condition.

FIGS. 2A and 2B also exhibit two characteristics of the above honeycomb structure body. The first one is that the honeycomb 2 is surrounded by a rim 3 of the foam material having a width of 15 mm, as the dimensions of the foam material is greater than those of the honeycomb by 30 mm. This characteristic comes directly from the problem solving measure of the present invention.

Another characteristic is that a projection 4 of the honeycomb 2 is formed above the surface of the foam material 1. This projection 4 is formed by pressing in the honeycomb 2 having the thickness of 30 mm into the foam material 1 whose thickness is 28 mm, and stopping motion when the lower surface of the honeycomb comes to that of the foam material, leaving the projection 4 of 2 mm above the surface of the foam material 1.

The projection 4 works for a surface-guard of the foam material, and at the same time, makes it possible to apply the adhesive agent only to the tip of the projection 4, not to the surface of the surface of the foam material 1.

There can be a case, depending on the usage, where no projection is produced, by selecting the thicknesses of the honeycomb and the foam material to be equal.

EXAMPLE 2

FIGS. 3A and 3B are a section and a plan showing a honeycomb structure body for a second example of the present invention, which is provided with a air room 5 in the middle of the body thickness. The honeycomb structure body of this configuration effectively absorbs sounds of a full frequency band ranging from low to high frequencies.

In this example, items other than that the thickness of the honeycomb is 50 mm, and that two foam material sheets 1, 1' having a thickness of 20 mm each are used, are the same as those in the example 1. The thickness of the foam sheet can be 15 mm and 25 mm, each.

By pressing in the two foam sheets into the cells of honeycomb from the upper and/or lower end, the honeycomb is surrounded by the rims of the foam sheets, each has 15 mm width, and an air room 5 having the thickness of 10 mm between the two foam sheets is formed in the middle of thickness of the honeycomb.

The reference sign 3a denotes a support which is inserted between the rims to maintain the air room 5 there. The support 3a can be formed by producing frame-like banks on top of the surface of the foam sheet in advance, or by inserting four-faced rods of the foam material in-between the foam sheets from the four sides.

EXAMPLE 3

FIGS. 4A and 4B are a section and a plan showing a honeycomb structure body for a third example of the present invention, which comprises two honeycombs 2, 2', placed respectively upper and lower parts in a thick foam material 1. And, between the two honeycombs 2, 2', there is an intermediate foam layer 6 having no honeycomb there.

Items other than that the thickness of the foam material is 50 mm, and that two honeycombs whose thickness is 20 mm each are used, are the same as those in the example 1. Each thickness of the pair of honeycombs can be 25 mm and 15 mm.

In this example, the honeycomb is surrounded by the rim 3, and projections 4, 4' of the honeycomb are formed from both surfaces of the foam material.

In the honeycomb structure body of the example 3, heat flow conducting in the body is cut by the intermediate foam layer 6, the foam material consisting the intermediate foam layer 6 makes itself an adiabatic layer. With a thicker intermediate foam layer 6, a greater adiabatic nature is attained.

The honeycombs positioned near the surfaces of the foam material can serve as surface protection.

EXAMPLE 4

FIGS. 5A and 5B are a section and a plan showing a sandwich panel for a fourth example of the present invention, which has in its center the honeycomb structure body shown in FIG. 2.

In the honeycomb structure body, as shown in FIG. 2, there are the rim 3 and the projections 4 above both sides of the foam material, which serve as adhesion spots to which the adhesive agent is applied, to adhere the surface materials 8, 8'. The surface materials 8, 8' are aluminum plates of 1.2 mm thick, a gas barrier material. When sound absorbing or humidity conditioning material is sought, a gas-permeable material is used on one or both sides thereof.

The projection 4 can be formed on one or both surface(s) of the foam material, or no projection at all.

The sandwich panel of the example 4 was produced by: applying a well agitated two-liquid epoxy adhesive agent 7 on the aluminum plates 8, 8' at a rate of 300~600 g/m², the projections 4 are pushed against the aluminum plates 8, 8' to adhere each other. After the adhesive agent hardened, edge parts of the panel is cut to fit the dimensions of the aluminum plates. It is easy to process the panel as the edge parts thereof are covered with rims 3.

EXAMPLE 5

FIGS. 6A, B$_1$, B$_2$ and C illustrate 3 cases of after processes added to the sandwich panel shown in the fourth example above. FIG. 6A shows a case in which a reinforcement 5a is inserted partly around the panel. FIGS. 6B$_1$, 6B$_2$ show a case in which a screw plate 5b1 for fixing a connecting plate 5b2 for connecting two panels with screw to a prescribed position on the surface of the panel. FIG. 6C shows a case in which a protection plate 5c is put to the entire periphery of the panel.

In the examples shown above, cases in which dimensions in breadth and width of the foam sheet(s) are both larger than those of the honeycomb. However, if either of breadth and width is larger than that of the honeycomb, the same advantage can be obtained.

EXAMPLE 6

FIGS. 7~10 are conceptual diagrams or various sections and plans showing the process of manufacturing the sandwich panel of the present example.

FIG. 7(A) illustrates a situation in which an adhesive agent 7 is poured into a flat and open vat 9 to the depth of 2~3 mm, and over the vat, there is seen a honeycomb 2.

The honeycomb 2 can be made of paper, metal, plastics, inorganic substance, and above all, paper is preferable from the view point of weight. In this example, a paper honeycomb soaked with magnesium silicate was used. The shape of the cells is not restricted to a hexagon, but triangle, square, pentagon, circle, wavy pattern are acceptable.

Though an aluminum fibre cloth was adopted for the gas permeable surface material in this example, a glass fibre cloth, woven plastic fibre cloth, and so on will be usable.

The vat 9 is as large as it can take in a honeycomb having dimensions of 1000×1000×30 mm in breadth-width-thickness, and the emulsion adhesive agent poured in there has a viscosity of 45,000~85,000 MPa·s, containing 42~46 wt % of non-volatile components and 54~58 wt % of moisture.

The honeycomb 2 having dimensions 980×980×30mm in breadth-width-thickness was immersed in the vat, and the adhesive agent 7 was applied to the height of 1~2 mm from the tip of the cell walls.

FIG. 7(B) illustrates a situation in which the honeycomb 2 is immersed in the adhesive agent 7 held in the vat 9. and FIG. 7(C), the adhesive agent 7 put to the tip of the cell wall in a belt-like area of a certain height, and shaped in a small drop there (shown by reference sign 7).

FIG. 8(A) illustrates a situation in which a gas permeable surface material 8 made of aluminum fibre is pushed against the tip of cell walls of the honeycomb where the adhesive agent is applied. The dimensions of the surface material 8 are 1000×1000×1.6 mm in breadth-width-thickness. The reference sign 7 denotes the adhesive agent filling the recess made by the tip of cell walls and the surface material.

FIG. 8(B) illustrates a situation in which the surface material 8 after once having been adhered to the cell walls of the honeycomb is torn away for a test of hardening result. Broken cell walls near the adhering spot are seen (shown by the reference sign 10). The gas permeable surfaces 11 which are important for sound or moisture absorption/releasing are not clogged with the adhesive agent.

FIG. 9 illustrates a situation in which the foam material 1 is filled in the cell spaces. The honeycomb is laid on the foam material, and pressed down until the upper surface of the honeycomb where the adhesive agent has been applied is reached. Water in the adhesive agent is absorbed by the foam material in this situation, the adhesive agent hardens rapidly.

In FIG. 9, the dimensions of the foam material 1 are 1000× 1000×28 mm in breadth-width-thickness, which are larger than those of the honeycomb 2 by 20 mm in breadth and width. Accordingly, a rim (reference sign 3) of the foam material of 10 mm width is formed around the honeycomb. Thanks to the rim, cutting of the cell walls near the edges of the panel is prevented, and the foam material included in adjacent cells is prevented from dropping off.

Because the thickness of the foam material is 28 mm, and the thickness of the honeycomb is 30 mm, an allowance of 2 mm is given, and it produces a projection above the surface of the foam material, when the honeycomb is fully pressed in the foam material. In the drawing, a reference sign 4 is assigned to the projection. The projection 4 supports the surface of the surface material where the adhesive agent is applied material, not to closely touch with the surface of the foam material, and prevent the linked-cellular of the foam material from being clogged.

For the gas barrier surface material, aluminum plate is preferable because of light weight, easy process ability, and back up effects in obtaining a self sustaining strength. For the adhesive agent 7, epoxy compounds (urethane compounds or acrylic compounds can be also used) which harden at normal temperature, are preferred. One of these adhesive agent is applied all over the surface of the aluminum plate to adhere it to the projections 4. With this treatment, corrosion prevention against moisture can be expected.

On the other hand, as mentioned above, the phenol foam has a strong water absorbing ability. When the foam material filled in the cell spaces comes in contact with the adhesive agent 7, a rapid absorption of water in the adhesive agent occurs, and hardening of the adhesive agent is accelerated.

EXAMPLE 7

The same manufacturing process described in EXAMPLE 6 in and in FIG. 7-FIG. 9 is applied to Example 7.

Because the thickness of the foam material is 28 mm, and the thickness of the honeycomb is 30 mm, as shown in FIG. 9, an allowance of 2 mm is given, and it produces a projection above the surface of the foam material 1, when the honeycomb is fully pressed in the foam material 1. In the drawing, a reference sign 4 is assigned to the projection. When the gas barrier surface material 80' is attached to the opposite surface against the foam surface where the gas permeable surface material 80 is attached (as shown in FIG. 11), the projection 4 supports the surface of the adhesive material 70' after the adhesive agent is applied to surface material 80', not to closely touch with the surface of the foam material 1, and prevent the linked-cellular of the foam material 1 from being clogged. In FIG. 11, a reference sign 80 is assigned to the gas permeable surface material which is the same material of 8 described in FIG. 8(A), FIG. 9 and FIG. 10.

For the gas barrier surface material 80', aluminum plate is preferable because of light weight, easy process ability, and back up effects in obtaining a self sustaining strength. For the adhesive agent 70', epoxy compounds (urethane compounds or acrylic compounds can be also used) which harden at normal temperature, are preferred. One of those adhesive agent is applied all over the surface of the aluminum plate 80' to let it adhere to the projection 4. With this treatment, corrosion prevention against moisture can be expected.

On the other hand, the phenol form has a strong water absorbing ability. When the foam material filled in the cell spaces comes in contact with the emulsion adhesive agent 70, rapid absorption of water in the adhesive agent occurs, and hardening of the adhesive agent is accelerated. The advantages of adopting the emulsion adhesive agent 70 are also described in the paragraph preceding Example 1 above.

The foam material 1 in FIG. 11 can be replaced by the foam sheets 1 and 1' in FIG. 3(A), with the air room 5 provided between the foam sheets 1 and 1'. These complete panel structures are shown in FIG. 12.

REFERENCE SIGNS

1, 1' foam material
2, 2' honeycomb
3 rim formed by foam material
3a support for air room
4, 4' projection
5 air room
5a reinforcement
5b₁ screw plate
5b₂ screw plate
5c protection plate
6 intermediate foam layer
7 adhesive agent
8, 8' surface material
9 vat
10 cell wall broken near adhered spot
11 gas permeable surface material
70 emulsion adhesive agent
70' epoxy compounds adhesive agent
80 gas permeable surface material
80' gas barrier surface material

The invention claimed is:

1. A honeycomb structure body comprising,

A phenol foam sheet (1) inserted into cell spaces of honeycomb (2), a gas permeable surface material (80) and a gas barrier surface material (80'), wherein the gas permeable surface material (80) is pressed against tips of walls of the honeycomb cell, whose narrow band area is applied with an emulsion adhesive agent, the phenol foam sheet (1), which is inserted fully into the cell spaces of honeycomb (2) to contact with the emulsion adhesive agent applied on the above area, is made of linked cellular structure characterized by a strong water absorbing ability, and the emulsion adhesive agent is hardened enough to make adhesion in limited spots between the gas permeable surface material (80) and the tips of the wall of the honeycomb cell due to the fact that water contained initially in the emulsion adhesive agent is absorbed by the phenol foam which has the strong water absorbing ability quickly after the phenol foam sheet is inserted to contact with the emulsion adhesive agent.

2. A honeycomb structure body according to claim 1, wherein one more phenol foam sheet (1') is included, and the two sheets (1,1') together are inserted into the cells of the honeycomb (2) to make a room (5) of certain depth between the two phenol foam sheets in middle of thickness of the honeycomb, thereby, a sound absorbing characteristic for frequencies ranging from low to high is attained.

3. A honeycomb structure body according to claim 1, wherein height of the honeycomb (2) is greater than thickness of the foam phenol foam sheet (1), so that an upward and/or downward ends of the honeycomb's cell walls make projections (4) by certain length beyond the surface(s) of the phenol foam sheet (1), which enable the adhesive agent applied to only the narrow band area of the tips rather than all over the surface of the phenol foam sheet in order not to damage its permeability.

4. A honeycomb structure body according to claim 1, wherein one more honeycomb (2') is included, and the phenol foam sheet (1) has thickness greater than total thickness of the two honeycombs (2,2'), and the two honeycombs are pressed into the phenol foam sheet (1) from both sides thereof, leaving an intermediate foam layer (6) where no honeycomb is included, thereby heat flow conducting in the honeycomb is cut, and an adiabatic layer appears there.

5. A honeycomb structure body according to claim 1, wherein size in breadth and width of the phenol foam sheet is greater than those of the honeycomb, so that the honeycomb is surrounded by the edge of the phenol foam sheet after insertion.

* * * * *